2,792,033

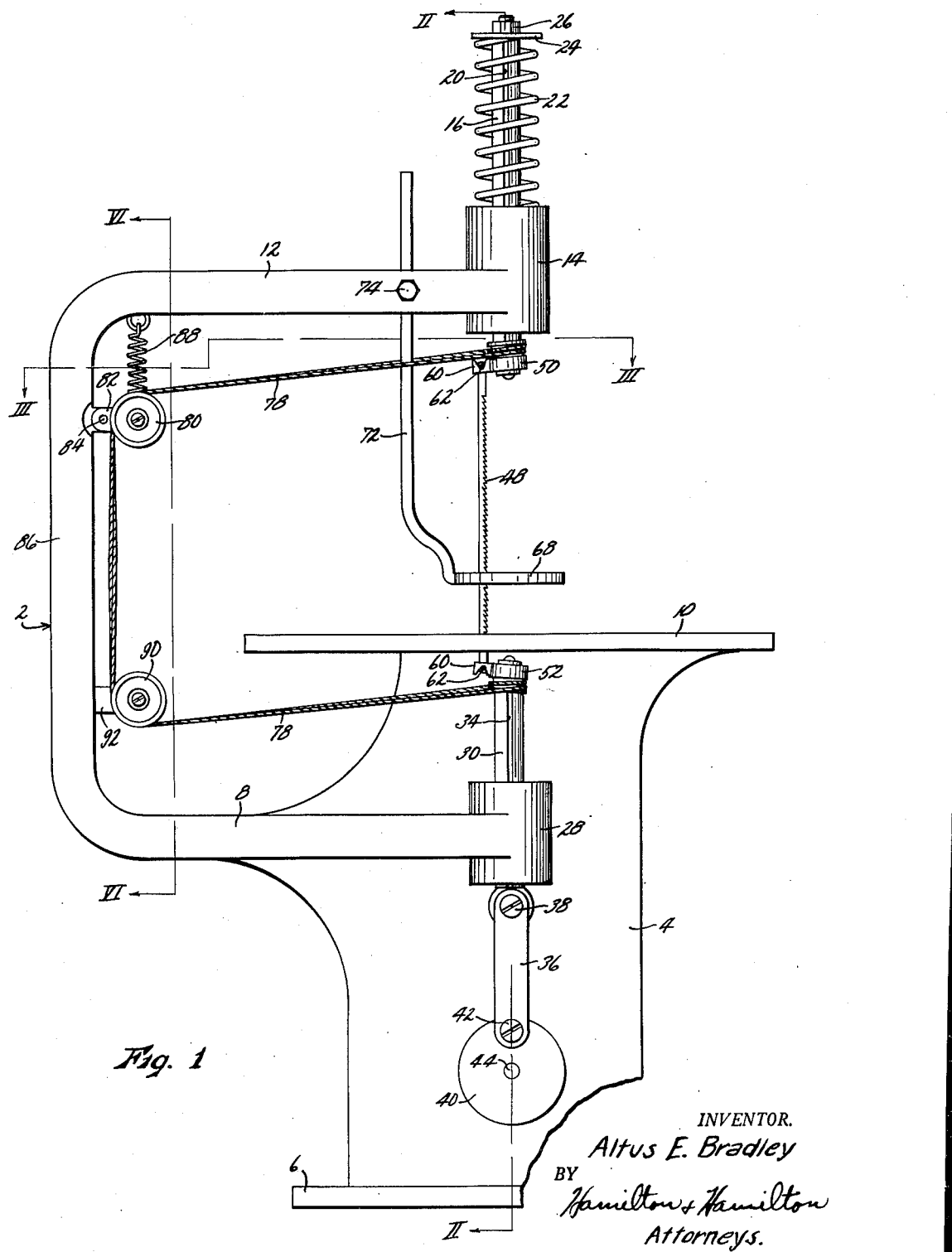

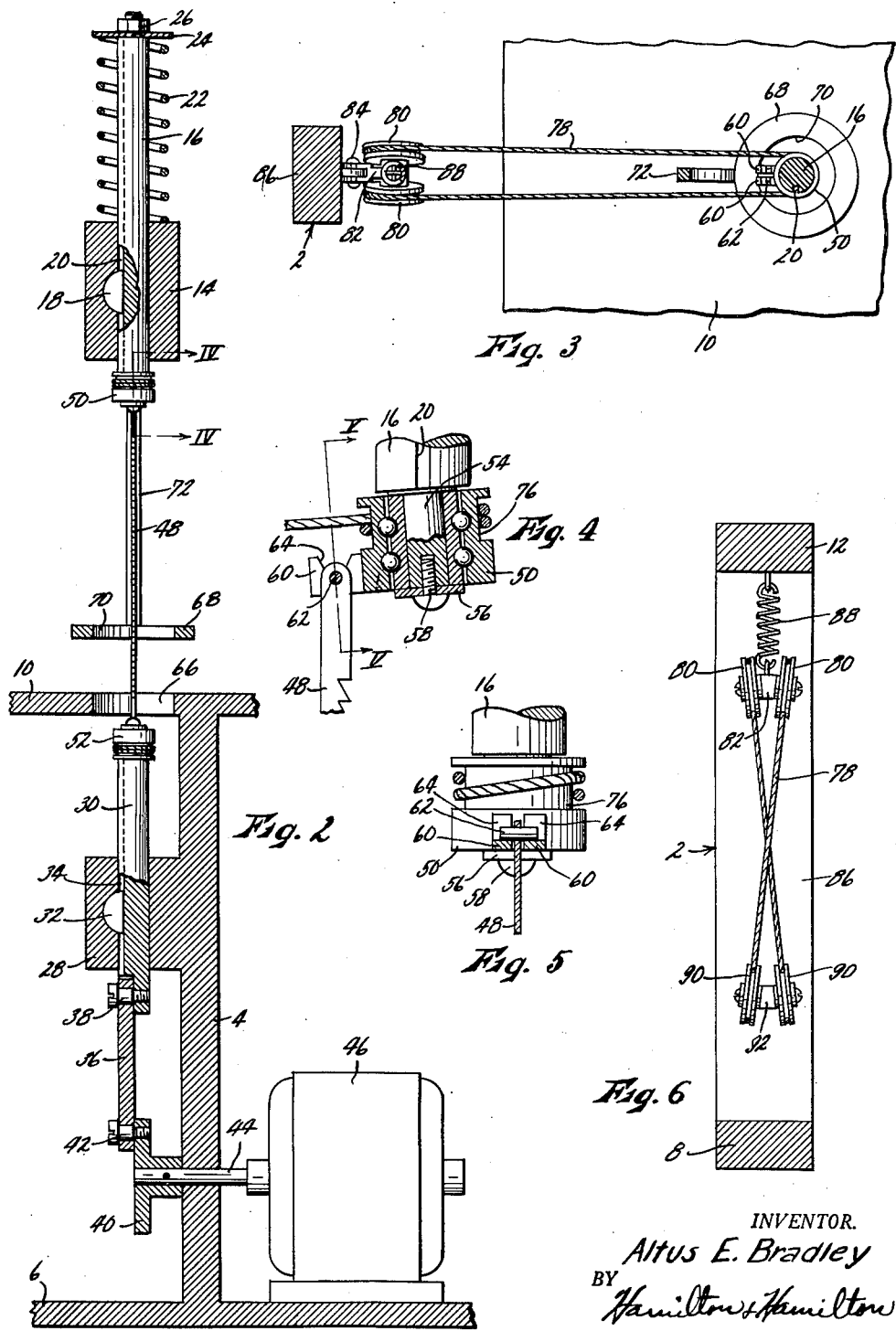

SWIVELED JIG SAW

Altus E. Bradley, Kansas City, Mo.

Application June 27, 1955, Serial No. 517,974

4 Claims. (Cl. 143—74)

This invention relates to new and useful improvements in sawing equipment, and has particular reference to jig saws.

The principal object of the present invention is the provision of a vertically reciprocable saw wherein the saw blade is rotatable about an axis parallel to the direction of reciprocation, whereby the direction of cut in a work piece may be altered at will without necessity of turning said work piece relative to the frame or other supporting structure of the saw. The advantages of this feature are readily apparent, particularly where the work piece is large or heavy.

Another important object of the present invention is the provision of a jig saw of the type described wherein the blade rotates about its longitudinal axis automatically in response to the direction a work piece is urged thereagainst. This is accomplished generally by castering the blade to pivot freely about an axis parallel to but spaced outwardly from the cutting edge thereof.

A further object is the provision, in a jig saw which is castered as above described, of means for rotating said blade automatically to a neutral position whenever it is not engaged by a work piece.

A still further object is the provision, in a jig saw of the character thus far described, of means mechanically interconnecting the ends of the blade, whereby unequal angular movement of the respective ends is prevented.

Other objects are simplicity and economy of construction, efficiency and dependability of operation, and wide flexibility of usage.

With these objects in view, as well as other objects which will appear in the course of the specification, reference will be had to the drawing, wherein:

Fig. 1 is a side elevational view of a jig saw embodying the present invention, partially broken away, Fig. 2 is a sectional view taken on line II—II of Fig. 1 with parts left in elevation and partially broken away, Fig. 3 is a fragmentary sectional view taken on line III—III of Fig. 1, Fig. 4 is an enlarged fragmentary sectional view taken on line IV—IV of Fig. 2, Fig. 5 is a sectional view taken on line V—V of Fig. 4, and Fig. 6 is a sectional view taken on line VI—VI of Fig. 1.

Like reference numerals apply to similar parts throughout the several views, and the numeral 2 applies to a rigid, upright C-shaped frame having at its lower end an integral standard 4 and a substantially planar base 6. Standard 4 extends above the lower arm 8 of frame 2, and carries at its upper end a horizontally disposed work supporting table 10. The upper arm 12 of the frame has at its free end a head 14 in which a vertically disposed upper spindle 16 is carried for axially sliding movement. Said spindle is prevented from rotating by a key 18 carried in said head and engaged slidably in a keyway 20 formed longitudinally in the spindle. Said spindle extends above head 14, and is urged upwardly at all times by a helical compression spring 22 disposed about the extended portion thereof. Said spring bears at one end against head 14, and at its opposite end against a washer 24 secured to the upper end of the spindle by nut 26.

Lower arm 8 of frame 2 carries at its free end, beneath table 10, a lower head 28 in which a vertically disposed lower spindle 30 is carried for longitudinal sliding movement, being secured against rotation by a key 32 carried in head 28 and engaging slidably in a keyway 34 formed in said spindle. Said spindle extends above and below head 28, and a connecting link 36 is pivotally secured to the lower end thereof by shouldered screw 38. The other end of said link is pivoted eccentrically to a disc 40 by means of screw 42. Said disc is fixed concentrically on the drive shaft 44 of a motor 46 which is mounted on base 6. Obviously operation of said motor will cause spindle 30 to reciprocate rapidly.

The elongated saw blade 48 extends between and is attached to the contiguous ends of spindles 16 and 30 by a special connection constituting the heart of the present invention. Said spindles are substantially coaxial. A blade mounting member 50 is mounted rotatably at the lower end of upper spindle 16, and a similar mounting member 52 is carried rotatably at the upper end of lower spindle 30. As best shown in Fig. 4, said mounting members each may constitute the outer race of a double-row ball bearing, said bearing being mounted on a reduced end portion 54 of the associated spindle, and retained thereon by washer 56 and cap screw 58. It will be noted that the spindle extensions 54, and hence the axes of blade mounting members 50 and 52, are inclined slightly in opposite directions with respect to the axes of the spindles, for a purpose to be described more fully below. The axes of both mounting members are inclined forwardly from the spindle axis.

A pair of closely spaced apart lugs 60 are attached rigidly to and extend radially from each of the mounting members 50 and 52, and the ends of blade 48 are disposed respectively between said lugs. A short cylindrical pin 62 is welded or otherwise fixed transversely in each end of the blade, and the end portions of said pins are seated pivotally in notches 64 formed in lugs 60. The blade is of course maintained in tension at all times by spring 22.

It will be apparent that the blade may thus rotate about an axis parallel to but spaced apart from the cutting edge thereof. The hole 66 in table 10 through which the blade passes must of course be of sufficient diameter to permit this orbital movement of the blade. Similarly, a work guide 68 disposed above the table and adapted to hold work pieces down against the table has the form of a ring the central hole 70 of which is concentric and of equal diameter with hole 66. Said guide is carried by a generally vertical square bar 72 which is slidably adjustable in upper frame arm 12 and securable therein at any desired elevation by set screw 74.

Blade mounting members 50 and 52 are externally cylindrical, and each have a portion of reduced diameter forming a cable drum 76 (see Figs. 4 and 5). An endless cable 78 has a portion thereof wrapped securely around the drum of member 50. The two opposed reaches of the cable loop are then extended rearwardly and trained respectively over a pair of pulleys 80 which are rotatably mounted at the free end of an arm 82, said arm being pivoted at its opposite end, as at 84, to the upright leg 86 of frame 2, adjacent the upper end thereof. A tension spring 88 is attached at one end to arm 82 and at its opposite end to upper arm 12 of the frame. Said spring urges said arm pivotally upwardly to tension the cable, as will be described below. The cable reaches extend downwardly from pulleys 80, and are trained respectively over a pair of pulleys 90 which are rotatably mounted on a bracket arm 92 fixed to frame leg 86 adjacent the lower end thereof. The cable reaches then extend forwardly, and the loop is wrapped about the cable drum of blade mounting member 52.

The operation of the device is believed readily apparent. After motor 46 has been set in operation to cause reciprocation of the blade as previously described, the operator places a work piece on table 10 and moves it against the cutting edge of the blade in the usual manner. The direction of cut in the work may be varied at will, without turning the work on the table, simply by changing the direction of movement of the work on the table, since the direction of cut will always be opposite to the direction of movement of the work. The blade may thus be said to be swivelled or "castered" around its rotational axis. In other words, the blade turns to cut the desired pattern, instead of the work, and does so automatically in response to lateral pressure thereagainst, without necessity of manipulating a mechanical blade turning control with the hands or feet. The advantages of this operation are obvious, particularly where the work is so heavy as to be difficult to manage easily, or so large or long as to be difficult or impossible to turn in the throat of frame 2.

The operation of the saw as thus far described would occur even if the blade mounting members 50 and 52 were exactly coaxial. However, the slight inclining of the axes of these members, as shown, provides that the saw will always rotate to a given neutral position whenever it is not engaged by a work piece, for convenience in starting a cut on the next work piece. This occurs because, due to the angularity of the axes, any rotational movement of the blade from the neutral position shown draws spindles 16 and 30 closer together, pulling spindle 16 relatively downwardly against the pressure of spring 22. Said spring thus acts to return the saw to its neutral position. This returning force decreases as the angles between the axes of members 50—52 and the spindle axis decrease, and of course should only be very slight so as not to noticeably affect the "steering" action of the blade. The angularity of the blade axes is exaggerated in the drawing for purposes of clarity, and need actually be only very slight, say 1 to 1½ degrees. The neutralizing rotational force exerted on the blade by spring 22 does not cause twisting of the blade, since the force is equal in magnitude and direction at both ends of the blade. The pivotal mounting of the blade ends provided by pins 62 accommodates the varying angularity between the blade and members 50 and 52 as said members rotate.

The cable 78 equalizes the rotation of both ends of the blade, providing that both ends must retain equal angular positions at all times. It is apparent that the cable must be crossed (between pulleys 80 and pulleys 90, as shown) in order that members 50 and 52 will turn in the same direction. Spring 88 maintains the cable taut, and takes up the slack which would otherwise occur in said cable at the mid-portion of the saw stroke. This spring should be of substantial tension, so as to minimize any undulating, whip-like action of the cable. The saw would operate satisfactorily in most instances even without cable 78 or its equivalent, since ordinarily there is no tendency of the members 50 and 52 to turn unequally, for the reasons discussed above. However, such a tendency could occur when cutting very thick work, or work having a non-uniform density or "hard" spots.

While I have shown a specific embodiment of my invention, it is readily apparent that many minor changes of structure and operation could be made without departing from the spirit of the invention as defined by the scope of the appended claims.

What I claim as new and desire to protect by Letters Patent is:

1. A jig saw comprising a frame, upper and lower spindles carried for axial reciprocation by said frame, said spindles having parallel axes and being secured against axial rotation, a pair of blade mounting members rotatably mounted respectively on the contiguous ends of said spindles, the axes of said blade mounting members being slightly and oppositely inclined with respect to the axes of said spindles, an elongated blade having its ends attached respectively to said blade mounting members eccentrically to the axes thereof, resilient means carried by said frame and urging said spindles away from each other whereby to tension said blade, and means operable to reciprocate said spindles longitudinally.

2. A jig saw as recited in claim 1 wherein the ends of said blade are secured in said blade mounting members for pivotal movement about axes transverse to the blade and at right angles to the radii of eccentricity of the ends of said blade from the axes of said mounting members.

3. A jig saw as recited in claim 1 with the addition of mechanical means independent of said blade interconnecting said blade mounting members and operable to equalize the rotation of said members.

4. A jig saw as recited in claim 1 wherein said blade mounting members are externally formed to present cable drums, and with the addition of at least one pair of pulleys carried rotatably by said frame at a position laterally offset from said blade, and an endless cable forming an elongated loop, the ends of said loop being wrapped respectively about said cable drums and the intermediate portion of said loop being trained over said pulleys.

References Cited in the file of this patent

UNITED STATES PATENTS

| | | |
|---|---|---|
| 420,319 | Tardent | Jan. 28, 1890 |
| 617,440 | Jones | Jan. 10, 1899 |
| 1,453,335 | Bennett | May 1, 1923 |
| 1,580,407 | Carlson | Apr. 13, 1926 |
| 1,975,314 | Cross | Oct. 2, 1934 |
| 2,613,701 | Nathan | Oct. 14, 1952 |